United States Patent
Klosinski et al.

(10) Patent No.: US 10,267,231 B2
(45) Date of Patent: Apr. 23, 2019

(54) SYSTEMS AND METHODS FOR AUGMENTING GAS TURBINE POWER OUTPUT WITH A PRESSURIZED AIR TANK AND/OR AN EXTERNAL COMPRESSOR

(71) Applicant: General Electric Company, Schenectady, NY (US)

(72) Inventors: Joseph Phillip Klosinski, Atlanta, GA (US); Alston Ilford Scipio, Mableton, GA (US); Sanji Ekanayake, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 298 days.

(21) Appl. No.: 14/819,770

(22) Filed: Aug. 6, 2015

(65) Prior Publication Data
US 2017/0037780 A1    Feb. 9, 2017

(51) Int. Cl.
*F02C 6/16* (2006.01)
*F02C 7/04* (2006.01)

(52) U.S. Cl.
CPC .............. *F02C 6/16* (2013.01); *F02C 7/04* (2013.01); *Y02E 60/15* (2013.01)

(58) Field of Classification Search
CPC ... F02C 6/16; F02C 7/55; Y02E 50/15; Y02E 60/15
See application file for complete search history.

(56) References Cited

U.S. PATENT DOCUMENTS

| 3,831,373 A | 8/1974 | Flynt |
| 5,537,822 A | 7/1996 | Shnaid et al. |
| 5,845,479 A | 12/1998 | Nakhamkin et al. |
| 5,934,063 A | 8/1999 | Nakhamkin |
| 6,038,849 A | 3/2000 | Nakhamkin et al. |

(Continued)

FOREIGN PATENT DOCUMENTS

| EP | 2284375 A1 | 2/2011 |
| JP | 2001-193483 A | 7/2001 |

(Continued)

OTHER PUBLICATIONS

Lamonica, M., "Liquefied Air to Store Energy on U.K. Grid," IEEE Spectrum, Posted on Feb. 18, 2014, Retrieved from the Internet URL: http://spectrum.ieee.org/energywise/energy/the-smarter-grid/liquefied-air-to-store-energy-on-uk-grid, on Apr. 7, 2014, pp. 1 and 2.

(Continued)

*Primary Examiner* — Gerald L Sung
*Assistant Examiner* — Rene D Ford
(74) *Attorney, Agent, or Firm* — Eversheds Sutherland (US) LLP

(57) ABSTRACT

A system for augmenting gas turbine power output is disclosed. The system may include a gas turbine engine having a compressor, a combustor, and a turbine. The system also may include a pressurized air tank in communication with the gas turbine engine. Moreover, the system may include an external compressor in communication with the pressurized air tank. The external compressor may be configured to supply compressed air to the pressurized air tank, and the pressurized air tank may be configured to supply compressed air to the gas turbine engine.

17 Claims, 5 Drawing Sheets

(56) References Cited

U.S. PATENT DOCUMENTS

| | | |
|---|---|---|
| 6,134,873 A | 10/2000 | Nakhamkin et al. |
| 6,305,158 B1 | 10/2001 | Nakhamkin et al. |
| 6,474,069 B1 | 11/2002 | Smith |
| 6,519,944 B2 | 2/2003 | Smith |
| 6,745,569 B2 | 6/2004 | Gerdes |
| 6,766,646 B1 | 7/2004 | Ford et al. |
| 7,389,644 B1 | 6/2008 | Nakhamkin |
| 8,373,295 B2 | 2/2013 | Hoffmann et al. |
| 8,479,523 B2 | 7/2013 | Berry |
| 8,796,874 B2 | 8/2014 | Hoffmann et al. |
| 2009/0249794 A1 | 10/2009 | Wilkes et al. |
| 2011/0094236 A1 | 4/2011 | Finkenrath et al. |
| 2013/0061591 A1 | 3/2013 | Bove et al. |
| 2014/0060067 A1 | 3/2014 | Mazumder et al. |
| 2014/0074311 A1 | 3/2014 | Kearns et al. |
| 2014/0130468 A1* | 5/2014 | Jackson ............ B01D 46/0005 55/482 |
| 2014/0142779 A1 | 5/2014 | Stoettrup et al. |
| 2014/0210217 A1 | 7/2014 | Scipio et al. |
| 2014/0244055 A1 | 8/2014 | Rosson |
| 2015/0184593 A1 | 7/2015 | Kraft et al. |

FOREIGN PATENT DOCUMENTS

| | | |
|---|---|---|
| WO | 2010/085272 A1 | 7/2010 |
| WO | 2013/151909 A1 | 10/2013 |
| WO | 2014/066276 A2 | 5/2014 |
| WO | 2016142654 A1 | 9/2016 |

OTHER PUBLICATIONS

Extended European Search Report and Opinion issued in connection with related EP Application No. 16178318.8 dated Dec. 13, 2016.

Non-Final Rejection towards related U.S. Appl. No. 14/797,302 dated Mar. 10, 2017.

Kim et al., filed Jul. 13, 2015, U.S. Appl. No. 14/797,302.

"Sensing a winner—Kraft rolls out TurboPHASE on the industry's biggest stage," Combined Cycle Journal, Third Quarter 2013, pp. 40 and 42.

European Search Report and Written Opinion issued in connection with corresponding European Application No. 16181269.8 dated Jan. 4, 2017.

* cited by examiner

US 10,267,231 B2

SYSTEMS AND METHODS FOR AUGMENTING GAS TURBINE POWER OUTPUT WITH A PRESSURIZED AIR TANK AND/OR AN EXTERNAL COMPRESSOR

FIELD

The present disclosure relates generally to gas turbines and more particularly relates to systems and methods for augmenting gas turbine power output with a pressurized air tank and/or an external compressor.

BACKGROUND

During power plant operation, a situation may arise in which it is desirable to increase quickly the overall power output for a relatively brief period of time. Conventional techniques for increasing the output of a gas turbine engine include increasing compressor mass flow, increasing the flow of fuel to the combustor, and opening inlet guide vanes to the compressor. An increase in the compressor mass flow may be limited by operational constraints. Over-firing methods may provide a fast response but operating the turbine beyond normal combustion temperatures may lead to the degradation of hot gas path parts and an increase in maintenance costs. Further, the airflow to the compressor can only be increased if the gas turbine is operating at less than base load. There is thus a desire for improved gas turbine power augmentation systems and methods to accommodate transient grid frequency excursions.

BRIEF DESCRIPTION

Some or all of the above needs and/or problems may be addressed by certain embodiments of the present disclosure. According to an embodiment, a system for augmenting gas turbine power output is disclosed. The system may include a gas turbine engine having a compressor, a combustor, and a turbine. The system also may include a pressurized air tank in communication with the gas turbine engine. Moreover, the system may include an external compressor in communication with the pressurized air tank. The external compressor may be configured to supply compressed air to the pressurized air tank, and the pressurized air tank may be configured to supply compressed air to the gas turbine engine.

In another embodiment, a system for augmenting gas turbine power output is disclosed. The system may include a gas turbine engine having a compressor, a combustor, and a turbine. The system also may include a pressurized air tank in communication with the gas turbine engine. The compressor may be in communication with the pressurized air tank. The compressor may be configured to supply compressed air to the pressurized air tank. The system also may include an external compressor in communication with the pressurized air tank. The external compressor may be configured to supply compressed air to the pressurized air tank, and the pressurized air tank may be configured to supply compressed air to the gas turbine engine. Moreover, the system may include a bypass line from the external compressor to the gas turbine engine for bypassing the pressurized air tank. The external compressor may be configured to supply compressed air to the gas turbine engine by way of the bypass line.

According to another embodiment, a method for augmenting gas turbine power output is disclosed. The method may include filling, by an external compressor, a pressurized air tank in communication with a gas turbine engine. The method also may include supplying, based on short term output demand, compressed air from the pressurized air tank to the gas turbine engine.

Other embodiments, aspects, and features of the disclosure will become apparent to those skilled in the art from the following detailed description, the accompanying drawings, and the appended claims.

BRIEF DESCRIPTION OF THE DRAWINGS

Reference will now be made to the accompanying drawings, which are not necessarily drawn to scale.

DETAILED DESCRIPTION

Illustrative embodiments will now be described more fully hereinafter with reference to the accompanying drawings, in which some, but not all embodiments are shown. The present disclosure may be embodied in many different forms and should not be construed as limited to the embodiments set forth herein. Like numbers refer to like elements throughout.

Figure 1:
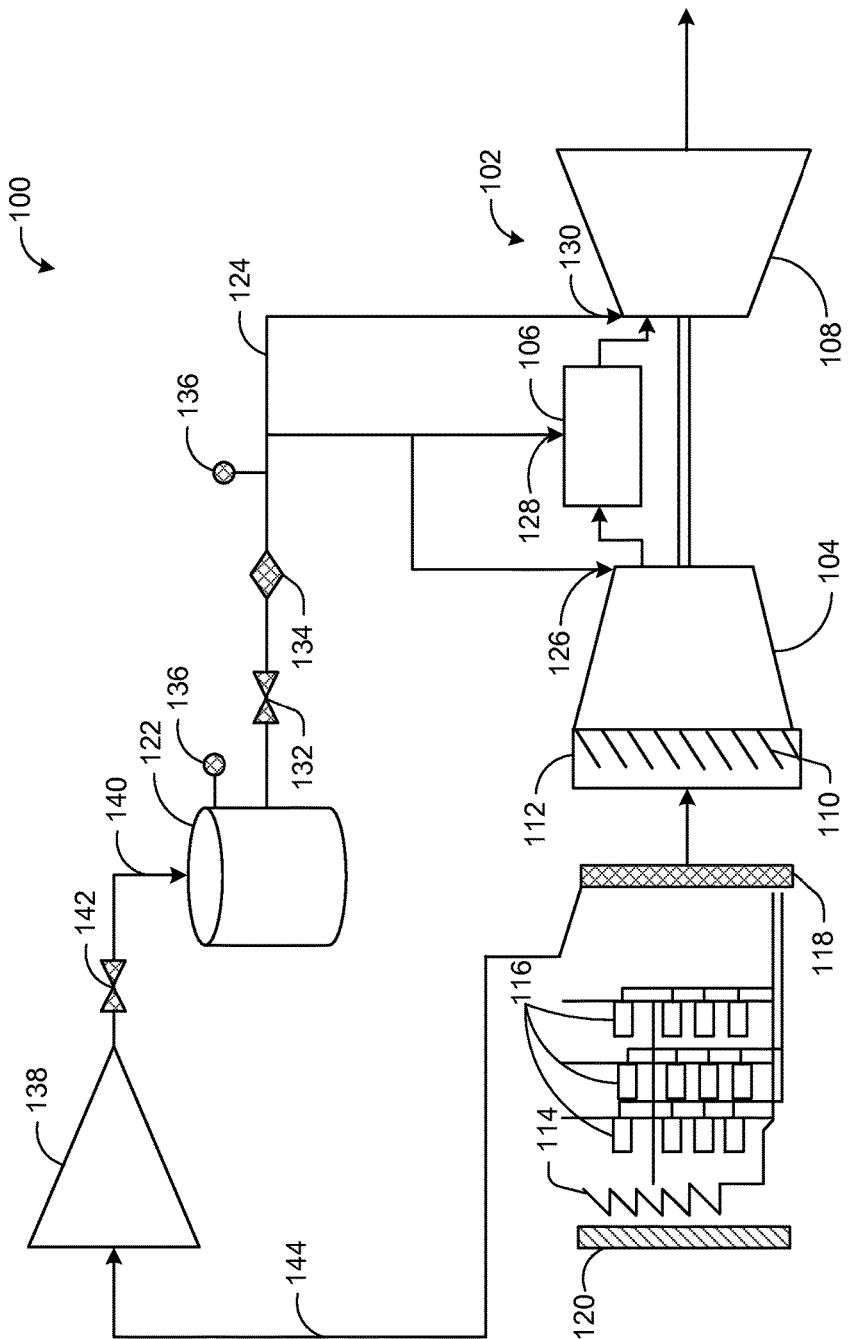
FIG. 1 schematically depicts a gas turbine system according to an embodiment.

FIG. 1 depicts a turbine system 100 for augmenting power output during a transient event, such as a low frequency grid event or the like. The gas turbine system 100 may include one or more gas turbine engines 102. Each gas turbine engine 102 may include a compressor 104 that compresses an incoming flow of air. The compressor 104 may deliver the compressed flow of air to a combustion subsystem 106. The compressed flow of air may mix with a compressed flow of fuel. The mixture may be ignited to create a flow of combustion gases. The flow of combustion gases may in turn be delivered to a turbine 108. The flow of combustion gases may drive the turbine 108 to produce mechanical work. The mechanical work produced in the turbine 108 may drive the compressor 104 and an external load such as, for example, an electrical generator or the like. The flow of combustion gases may be exhausted via an exhaust subsystem to a stack, a heat recovery steam generator, or otherwise disposed.

In some instances, the gas turbine system 100 may include a compressor inlet subsystem 110 with an articulated inlet guide vane assembly 112. In addition, in some instances, the gas turbine engine 102 may include and inlet screen 114 or filter house that includes filter assemblies having a plurality of inlet air filters 116. The gas turbine system 100 also may include an inlet bleed heat (IBH) manifold 118 and/or an anti-icing manifold 120.

The gas turbine system 100 may include a pressurized air tank 122 in communication with one or more components of the gas turbine engine 102 by way of one or more conduits 124. For example, the pressurized air tank 122 may be in communication with a compressor discharge casing 126 of the compressor 104, an inlet 128 of the combustor 106, and/or an inlet 130 of the turbine 108. The pressurized air tank 122 may be in communication with any portion or component of the compressor 104, the combustor 106, and/or the turbine 108. The conduits 124 may include one or more flow valves 132, flow sensors 134, and/or pressure sensors 136 for monitoring and/or controlling the flow of compressed air from the pressurized air tank 122. The pressurized air tank 122 may store compressed air therein. In this manner, the pressurized air tank 122 may provide compressed air to one or more components of the gas turbine engine 102 to maintain power output. In one example, the pressurized air tank 122 may instantaneously provide compressed air based on a short term grid event or power requirement. The pressurized air tank 122 is for illustrative purposes only. For example, the pressurized air tank 122 may store other fluids, both liquid and gas, such as nitrogen, oxygen, or fuels.

An external compressor 138 may be in communication with the pressurized air tank 122 by way of one or more conduits 140. The conduits 140 may include one or more flow valves 142, flow sensors, and/or pressure sensors for monitoring and/or controlling the flow of compressed air from the external compressor 138 to the pressurized air tank 122. The external compressor 138 may be configured to supply compressed air to the pressurized air tank 122. In turn, the pressurized air tank 122 may be configured to supply compressed air to one or more components of the gas turbine engine 102 as discussed above.

In some instances, the filter house 114 may be in communication with the compressor 104 and the external compressor 138 by way of one or more conduits 144. In this manner, the filter house 114 may supply filtered air to the compressor 104 and/or the external compressor 138.

Figure 2:
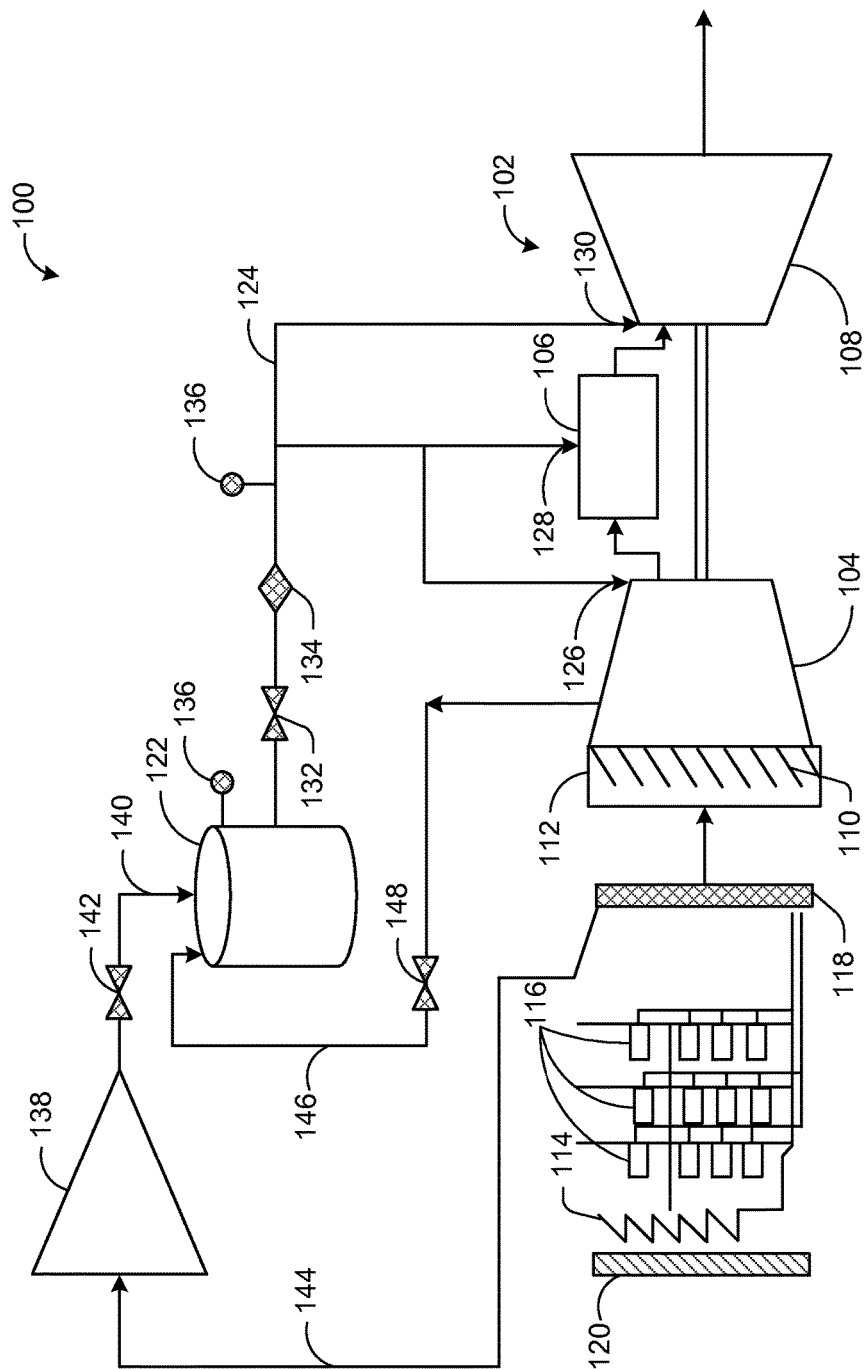
FIG. 2 schematically depicts a gas turbine system according to an embodiment.

In certain embodiments, as depicted in FIG. 2, the compressor 104 may be in communication with the pressurized air tank 122 by way of one or more conduits 146. The conduits 146 may include one or more flow valves 148, flow sensors, and/or pressure sensors for monitoring and/or controlling the flow of compressed air from the compressor 104 to the pressurized air tank 122. The compressor 104 may be configured to supply compressed air to the pressurized air tank 122. In this manner, the pressurized air tank may be filled with compressed air from the external compressor 138 and/or the compressor 104. In turn, the pressurized air tank 122 may be configured to supply compressed air to one or more components of the gas turbine engine 102 as discussed above.

Figure 3:
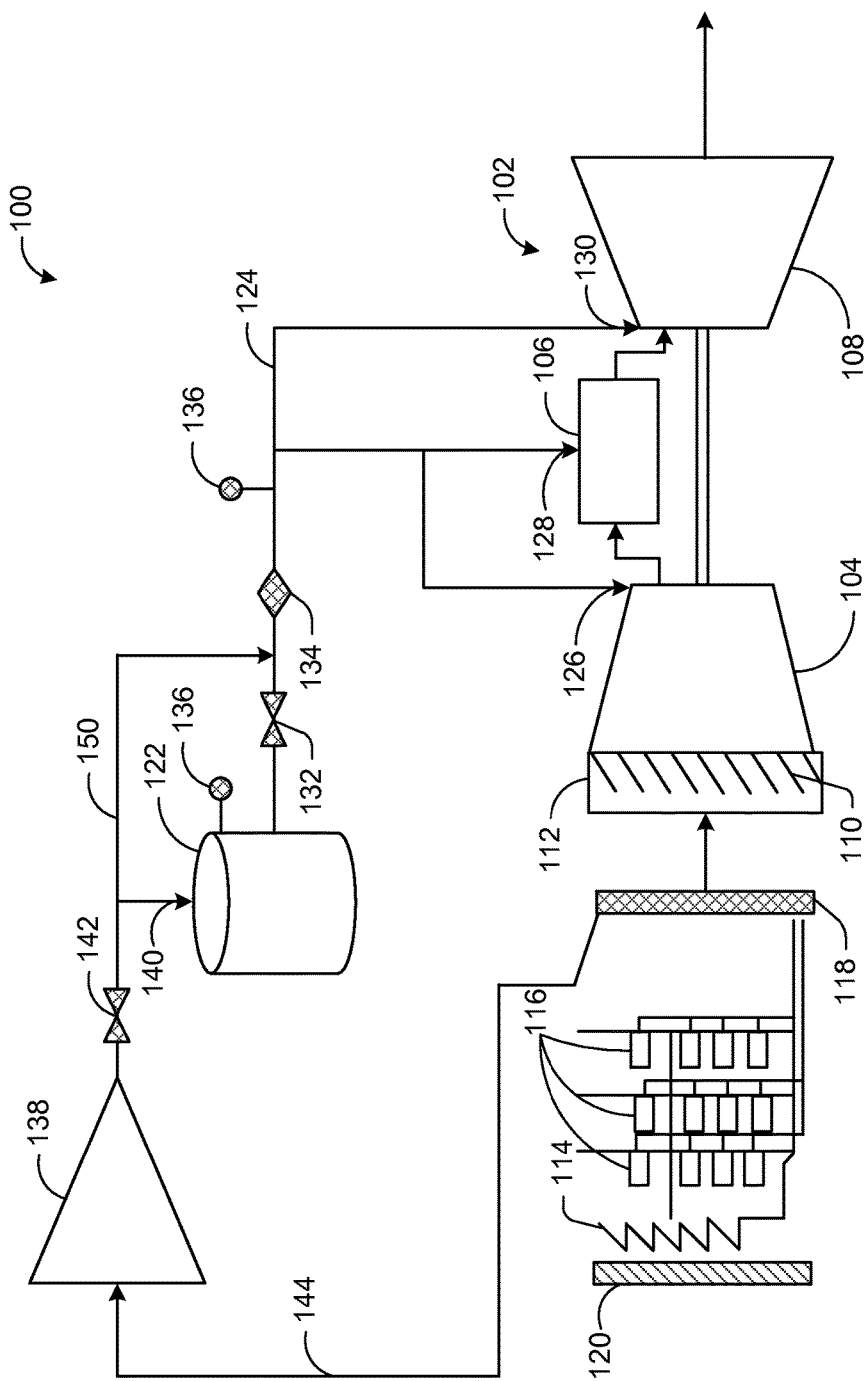
FIG. 3 schematically depicts a gas turbine system according to an embodiment.

As depicted in FIG. 3, the gas turbine system 100 may include a bypass line 150 from the external compressor 138 to the gas turbine engine 108. The bypass line 150 may bypass the pressurized air tank 122. The bypass line 150 may include one or more flow valves, flow sensors, and/or pressure sensors for monitoring and/or controlling the flow of compressed air from the external compressor 138 to the gas turbine engine 102. In this manner, the external compressor 138 may be configured to supply compressed air directly to the gas turbine engine 102 by way of the bypass line 150. As a result, the one or more components of the gas turbine engine 102 may be supplied with compressed air directly from the external compressor 138 or from the pressurized air tank 122. For example, the pressurized air tank 122 and/or the external compressor 138 may be in communication with the compressor discharge casing 126 of the compressor 104, the inlet 128 of the combustor 106, and/or the inlet 130 of the turbine 108.

In some instances, the external compressor 138 may provide compressed air directly to one or more components of the gas turbine engine 102 by way of the bypass line 150 to maintain power output. In one example, the external compressor 138 may provide compressed air based on a prolonged grid event or power requirement.

Figure 4:
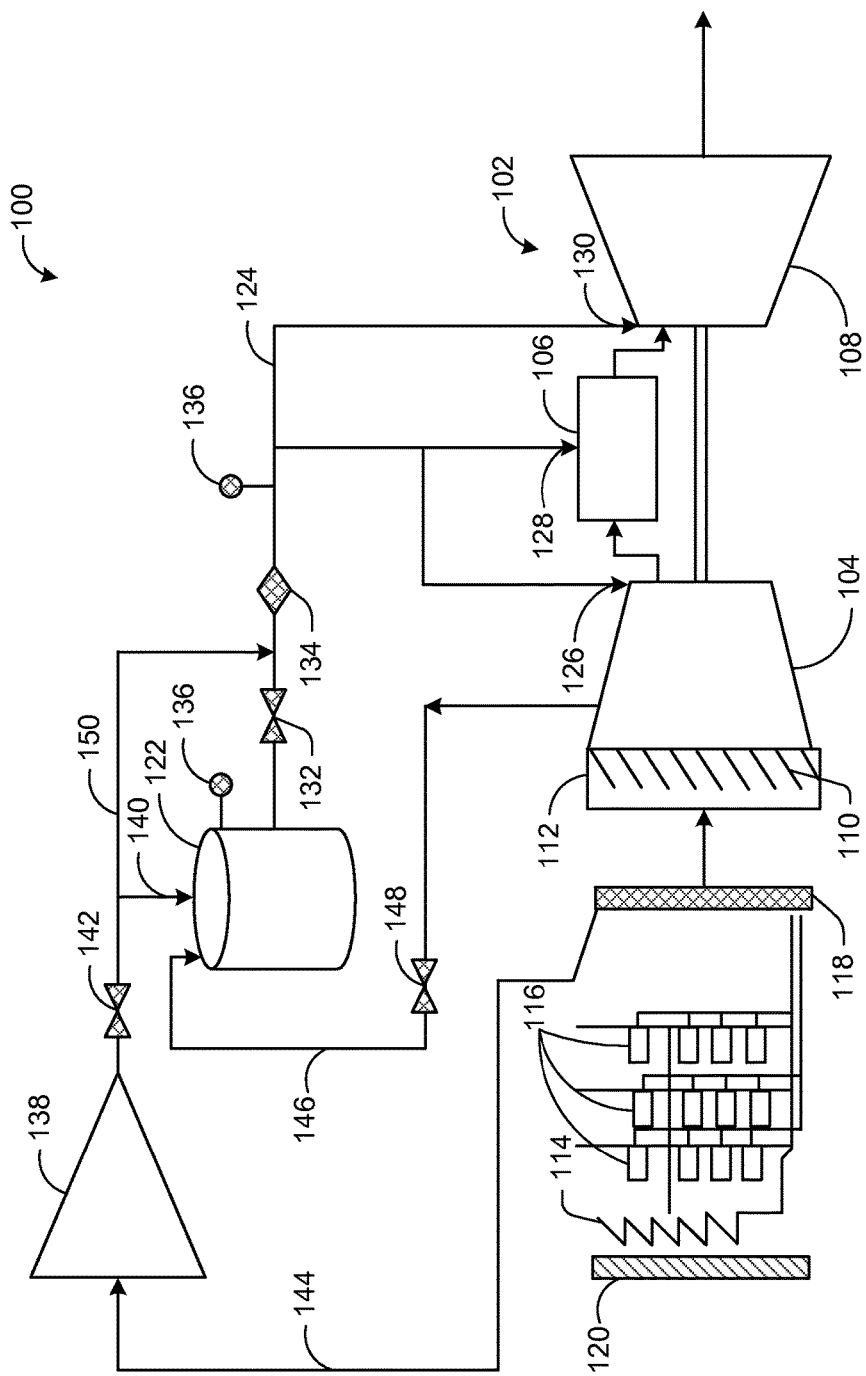
FIG. 4 schematically depicts a gas turbine system according to an embodiment.

In some instances, as depicted in FIG. 4, in addition to the bypass line 150, the compressor 104 may be in communication with the pressurized air tank 122 by way of one or more conduits 146. The conduits 146 may include one or more flow valves 148, flow sensors, and/or pressure sensors for monitoring and/or controlling the flow of compressed air from the compressor 104 to the pressurized air tank 122. The compressor 104 may be configured to supply compressed air to the pressurized air tank 122. In this manner, the pressurized air tank may be filled with compressed air from the external compressor 138 and/or the compressor 104. In turn, the pressurized air tank 122 may be configured to supply compressed air to one or more components of the gas turbine engine 102 as discussed above.

The various embodiments of the gas turbine system 100 depicted in FIGS. 1-4 may provide the ability to augment power output during a transient event, such as a low frequency grid event or the like. For example, the external compressor 138 and/or the pressurized air tank 122 may provide compressed air to one or more components of the gas turbine engine 102 to maintain power output. In one example, the pressurized air tank 122 may instantaneously provide compressed air based on a short term grid event or power requirement, while the external compressor 138 may provide compressed air based on a prolonged grid event or power requirement. In this manner, the size of the pressurized air tank 122 may be substantially reduced. In this manner, the gas turbine system 100 may accommodate short and long term operation of the gas turbine during low frequency events.

Figure 5:
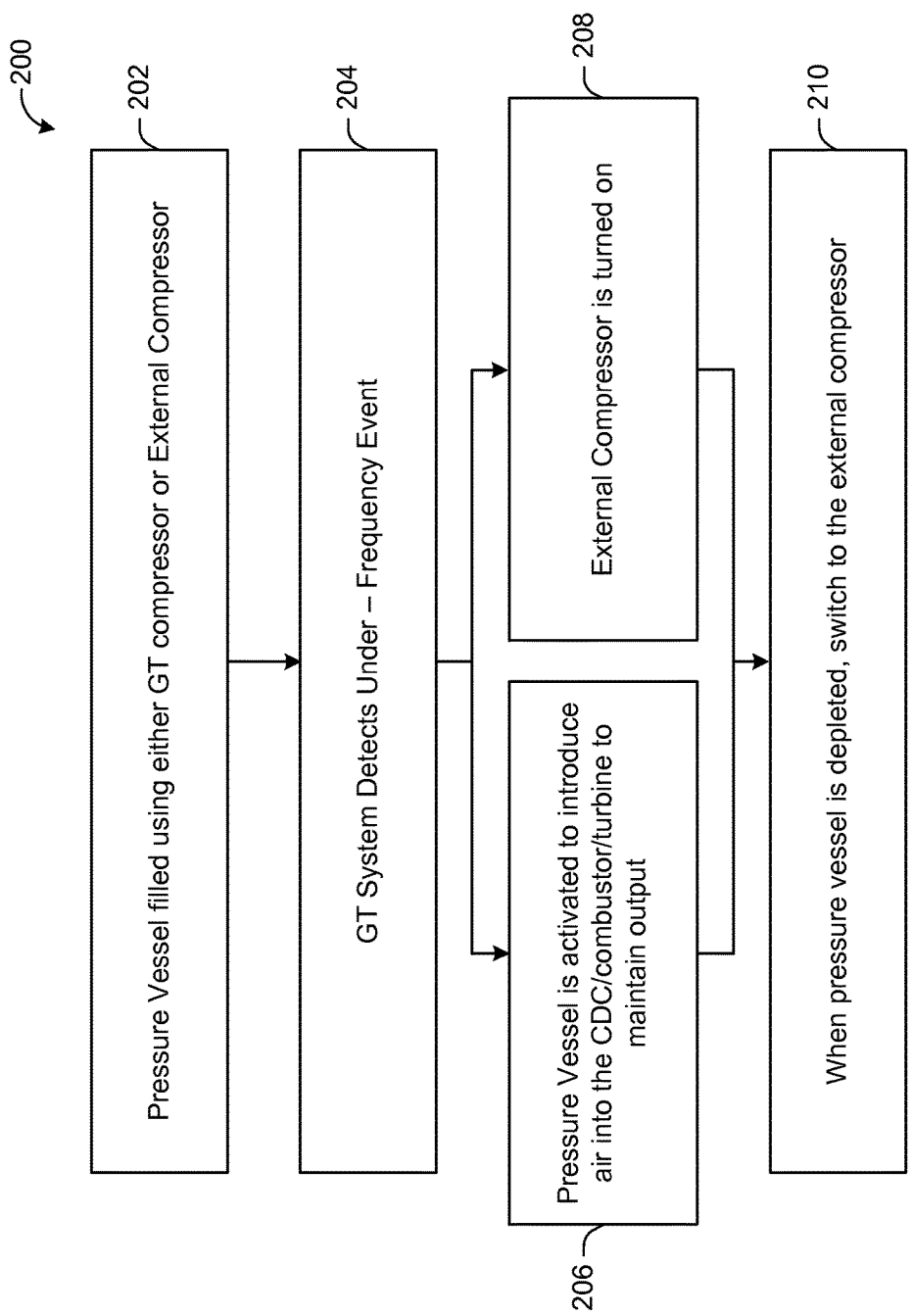
FIG. 5 depicts an example flow diagram according to an embodiment.

FIG. 5 depicts an example flow diagram of a method 200 for augmenting power output during a transient event, such as a low frequency grid event or the like. At block 202, the pressurized air vessel 122 may be filled with compressed air by the compressor 104 or the external compressor 138. At block 204, a transient event, such as a low frequency grid event or the like, may be detected. At block 206, the pressurized air tank 122 may be activated to provide compressed air to one or more components of the gas turbine engine 102. At block 208, the external compressor 138 may be activated. At block 210, if the transient event is prolonged, the external compressor 138 may provide compressed air to one or more components of the gas turbine engine 102 by way of the bypass line 150 to maintain power output.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed:

1. A system for augmenting gas turbine power output, comprising:
   a gas turbine engine comprising a compressor, a combustor, and a turbine; a pressurized air tank in communication with the gas turbine engine; and
   an external compressor in communication with the pressurized air tank, wherein the external compressor is configured to supply compressed air to the pressurized air tank or the gas turbine engine, and wherein the pressurized air tank is configured to supply compressed air to the gas turbine engine;
   a bypass line from the external compressor to the gas turbine engine for bypassing the pressurized air tank, wherein the external compressor is configured to supply compressed air to the gas turbine engine by way of the bypass line; and one or more flow valves disposed on the bypass line, wherein the one or more flow valves are configured to prevent compressed air from being supplied to the gas turbine engine from the external compressor when compressed air is supplied to the gas turbine engine from the pressurized air tank, wherein the compressor is in communication with the pressurized air tank via a conduit that bypasses the external compressor, wherein the compressor is configured to supply compressed air directly to the pressurized air tank.

2. The system of claim 1, wherein the pressurized air tank is in communication with a compressor discharge casing of the compressor.

3. The system of claim 1, wherein the pressurized air tank is in communication with an inlet of the combustor.

4. The system of claim 1, wherein the pressurized air tank is in communication with an inlet of the turbine.

5. The system of claim 1, further comprising a filter house in communication with the compressor and the external compressor.

6. The system of claim 1, wherein the pressurized air tank or the external compressor are in communication with a compressor discharge casing of the compressor.

7. The system of claim 1, wherein the pressurized air tank or the external compressor are in communication with an inlet of the combustor.

8. The system of claim 1, wherein the pressurized air tank or the external compressor are in communication with an inlet of the turbine.

9. The system of claim 1, further comprising a filter house in communication with the compressor and the external compressor.

10. A system for augmenting gas turbine power output, comprising:
    a gas turbine engine comprising a compressor, a combustor, and a turbine;
    a pressurized air tank in communication with the gas turbine engine, wherein the compressor is in communication with the pressurized air tank, wherein the compressor is configured to supply compressed air to the pressurized air tank;
    an external compressor in communication with the pressurized air tank, wherein the external compressor is configured to supply compressed air to the pressurized air tank;
    a bypass line from the external compressor to the gas turbine engine for bypassing the pressurized air tank, wherein the external compressor is configured to supply compressed air to the gas turbine engine by way of the bypass line; and
    one or more flow valves disposed on the bypass line, wherein the one or more flow valves are configured to prevent compressed air from being supplied to the gas turbine engine from the external compressor when compressed air is supplied to the gas turbine engine from the pressurized air tank,
    wherein the compressor is in communication with the pressurized air tank via a conduit that bypasses the external compressor.

11. The system of claim 10, wherein the pressurized air tank or the external compressor are in communication with a compressor discharge casing of the compressor.

12. The system of claim 10, wherein the pressurized air tank or the external compressor are in communication with an inlet of the combustor.

13. The system of claim 10, wherein the pressurized air tank or the external compressor are in communication with an inlet of the turbine.

14. A method for augmenting gas turbine power output, comprising:
    filling, by an external compressor, a pressurized air tank in communication with a gas turbine engine;
    filling, by a compressor of the gas turbine engine and via a conduit that bypasses the external compressor, the pressurized air tank; and
    supplying, based on short term output demand, compressed air to the gas turbine engine from the pressurized air tank; and
    configuring one or more flow valves to prevent compressed air from being supplied to the gas turbine engine from the external compressor when compressed air is supplied to the gas turbine engine from the pressurized air tank.

15. The method of claim 14, further comprising:
    bypassing, based on prolonged output demand, the pressurized air tank; and
    supplying compressed air from the external compressor to the gas turbine engine.

16. The method of claim 15, further comprising supplying compressed air from the pressurized air tank and/or the external compressor to a compressor discharge casing, an inlet of a combustor, an inlet of a turbine, or a combination thereof.

17. The method of claim 14, further comprising supplying compressed air from the pressurized air tank to a compressor discharge casing, an inlet of a combustor, an inlet of a turbine, or a combination thereof.

* * * * *